United States Patent [19]

Wilson

[11] 3,753,467
[45] Aug. 21, 1973

[54] TRACTOR-IMPLEMENT HYDRAULIC LIFT SYSTEM

[75] Inventor: Raymond W. Wilson, Washington, Mich.

[73] Assignee: Ford Motor Company, Dearborn, Mich.

[22] Filed: Dec. 27, 1971

[21] Appl. No.: 212,361

[52] U.S. Cl............................................ 172/3, 172/7
[51] Int. Cl............................................ A01b 63/112
[58] Field of Search ....................... 172/3, 2, 4, 7, 9, 172/705

[56] References Cited
UNITED STATES PATENTS

| | | | |
|---|---|---|---|
| 3,517,747 | 6/1970 | Fischer | 172/7 |
| 3,575,241 | 4/1971 | McKeon | 172/3 |
| 2,804,814 | 9/1957 | Czarnocki | 172/7 |
| 2,974,733 | 3/1961 | Fletcher | 172/7 |

*Primary Examiner*—Robert E. Pulfrey
*Assistant Examiner*—Stephen G. Pellegrino
*Attorney*—Peter F. Hilder and Keith L. Zerschling

[57] ABSTRACT

A tractor having an implement hitch which is lifted and lowered by a hydraulic lift system responsive to driveline torque is coupled to the hydraulic lift system of an implement attached to the rear of the tractor to control the implement hydraulic lift system responsive to driveline torque of the tractor.

4 Claims, 3 Drawing Figures

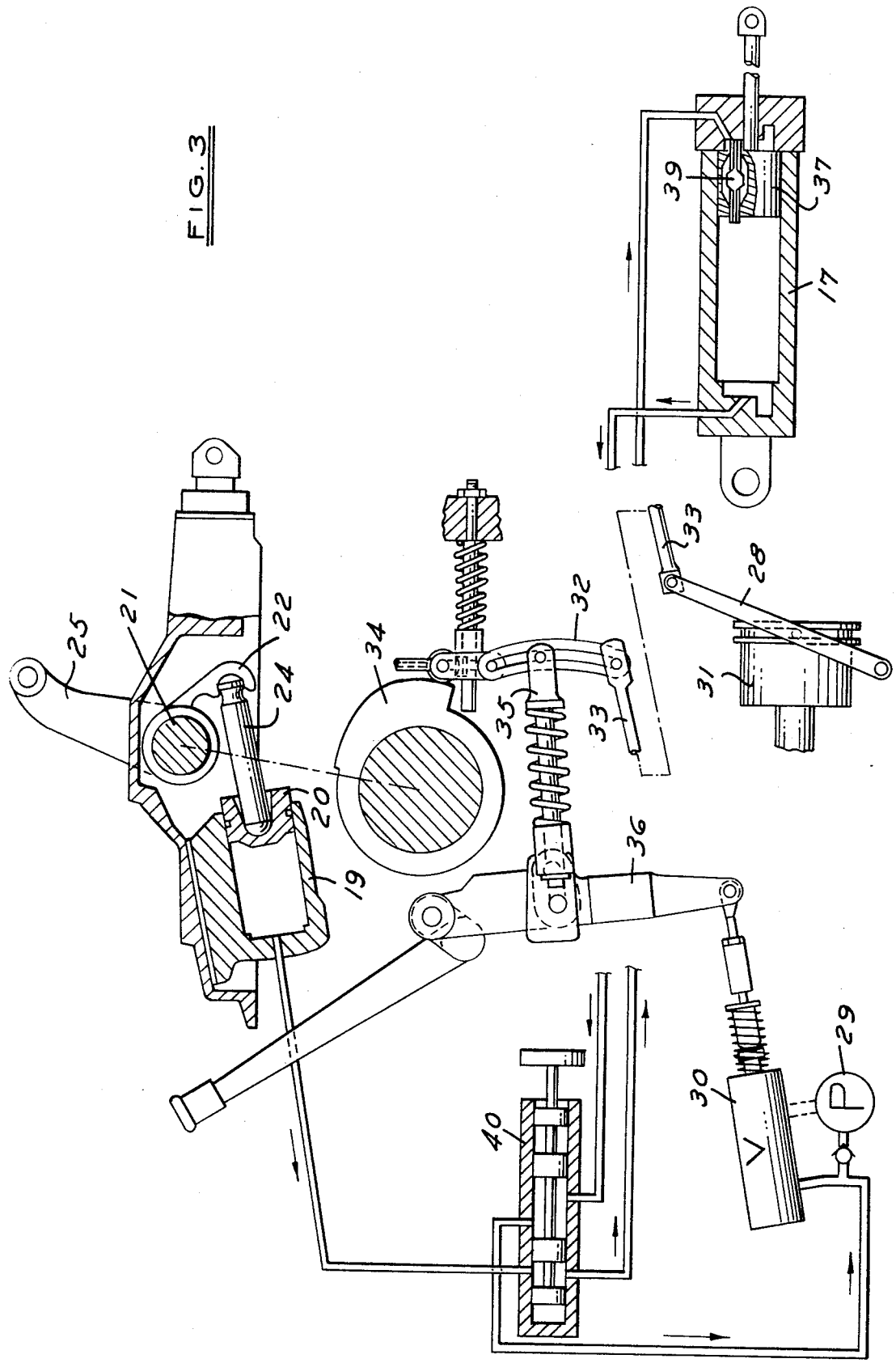

TRACTOR-IMPLEMENT HYDRAULIC LIFT SYSTEM

This invention relates to tractor-and-implement hydraulic lift systems and more particularly to such a system in which the height of a towed or semi-mounted soil-working implement may be controlled to maintain the tractor operating under a predetermined torque.

McKeon et al. U.S. Pat. No. 3,575,241 is directed to a tractor hydraulic lift system in which the height of the implement-supporting hitch may be controlled responsive to driveline torque, a soil-engaging implement mounted on the hitch being raised or lowered to maintain tractor driveline torque within selected predetermined limits. The present invention is directed to a system in which the hydraulic lift control of such a tractor is utilized to regulate the height of a semi-mounted or trailed implement by regulating flow to and from a hydraulic cylinder mounted on the implement, thus controlling the height of the implement responsive to tractor driveline torque.

According to the present invention, the implement-mounted cylinder is connected in series with the tractor lift cylinder whereby the torque-responsive control of the hydraulic system can be utilized to control the implement cylinder as well as the tractor lift cylinder.

Among the objects of the present invention are to provide a tractor-implement hydraulic lift system in which a hydraulic cylinder of a towed implement is actuated responsive to torque of the tractor driveline to regulate implement height and thus maintain an uniform, predetermined torque or load on the tractor; to provide such a system in which the hydraulic cylinder of the towed implement is controlled by admission of fluid to or withdrawal of fluid from the tractor hydraulic lift cylinder, and generally to improve such tractor-implement hydraulic lift systems.

Other objects and objects relating to details of construction will be apparent from the detailed description to follow.

FIG. 3 is a schematic view of the hydraulic system, showing fluid flow during drop condition.

Figure 1:
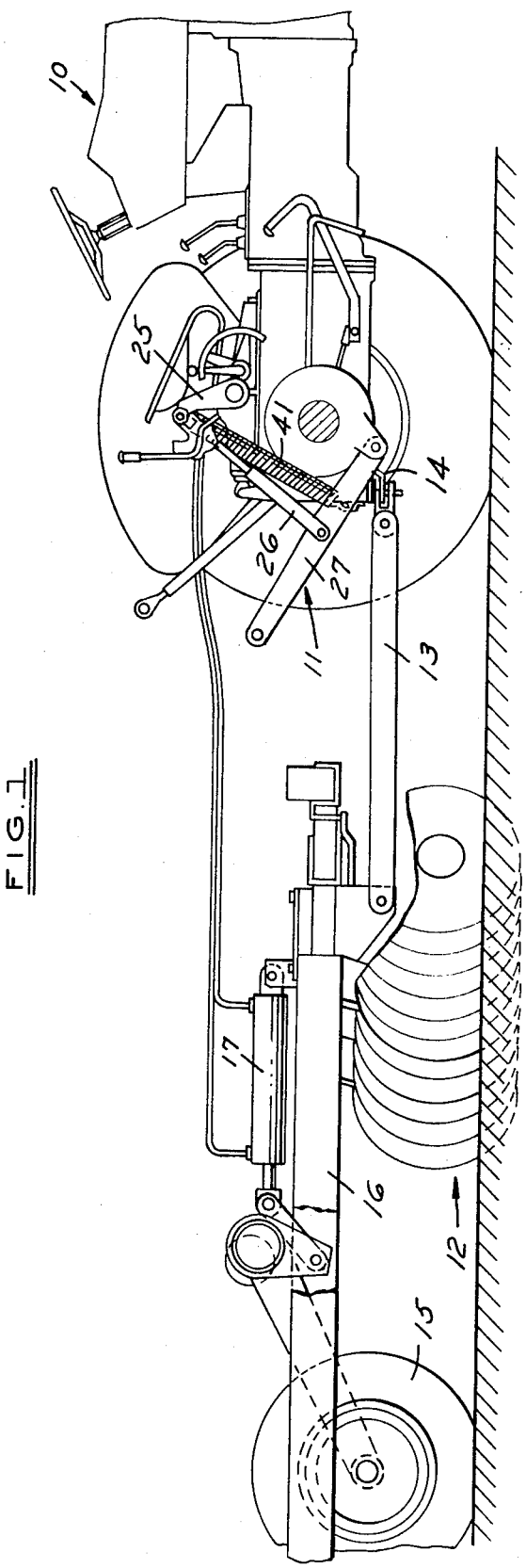
FIG. 1 is a side elevation of a tractor and harrow, portions of the tractor and harrow being broken away.

Referring now to the drawings, the tractor 10 of the present invention is provided with a liftable implement supporting hitch 11 and an hydraulic system for raising and lowering the hitch responsive to torque in the driveline of the tractor. The hydraulic control preferably is of the type disclosed in U.S. Pat. 3,575,241 of Apr. 20, 1971. The tractor hitch and its control system will be described in more detail hereinafter.

The implement 12, which in this instance is shown as a disc-type harrow, is attached by a tongue 13 to a drawbar 14 secured to the tractor for towing the implement. The implement 12 is provided with one or more gauge wheels 15 which are adapted to at least partially support the implement and regulate the degree of penetration of the harrow below the surface of the ground, thus determining the load on the tractor (towing force required). The gauge wheels are mounted for raising and lowering movement relative to the frame 16 of the harrow, the height of the gauge wheels being controlled by a double acting hydraulic cylinder 17. Harrows of this type are more or less conventional and well known in the art, one such harrow being shown in U.S. Pat. No 2,970,656.

The tractor 10 is provided with a lift cylinder 19 (FIGS. 2 and 3) which is a single acting cylinder. A piston 20 within the cylinder 19 is linked to a rockshaft 21 rotatably mounted on the tractor by means of a ram arm 22 and a connecting rod 24. By means of well known linkage including lift arms 25 mounted on the ends of the rockshaft 21 and lift links 26 extending downwardly from the lift arms and connected with draft links 27, the tractor hitch 11 is raised and lowered.

The tractor lift cylinder 19 is operated by hydraulic fluid under pressure provided by a hydraulic pump 29 operated by the tractor engine. A control valve 30 which preferably is of the spool valve type regulates flow of hydraulic fluid to and from the lift cylinder 19, flow of fluid to the cylinder serving to raise the tractor hitch 11. Release of fluid from the lift cylinder 19, which also is regulated by the control valve 30, permits the piston 19 to move to the left as viewed in FIG. 2 and permits the tractor hitch 11 to lower. The hydraulic system described in this paragraph and the paragraph immediately above is more or less conventional and has been used for a number of years in the well-known Ford tractors.

The control valve 30 is operated responsive to tractor driveline torque as described and claimed in U.S. Pat. 3,575,241. The mechanism for controlling the valve 30 consists of a torque sensing device 31 which may be in the form of a displaceable coupling interposed in the drive shaft between the tractor transmission and rear axle and serving to operate a floating lever 32. The torque sensing device 31 is linked to the lever 32 by a lever 28 moved by the torque sensing device and a link 33. The other end of the floating lever 32 is moved responsive to position control (position or height of the hitch), preferably by a position control cam 34 mounted on the rockshaft 21. A link 35 which may be moved along the length of the floating lever 32, acting through a valve operating lever 36, operates the control valve 30 to raise or lower the tractor hitch 11. By positioning the link 35 closer to one or the other end of the floating lever 32, the relative effect on valve movement of changes in driveline torque and the degree of movement of the tractor hitch may be determined. This system is generally as disclosed in said U.S. Pat. No. 3,575,241.

Figure 2:
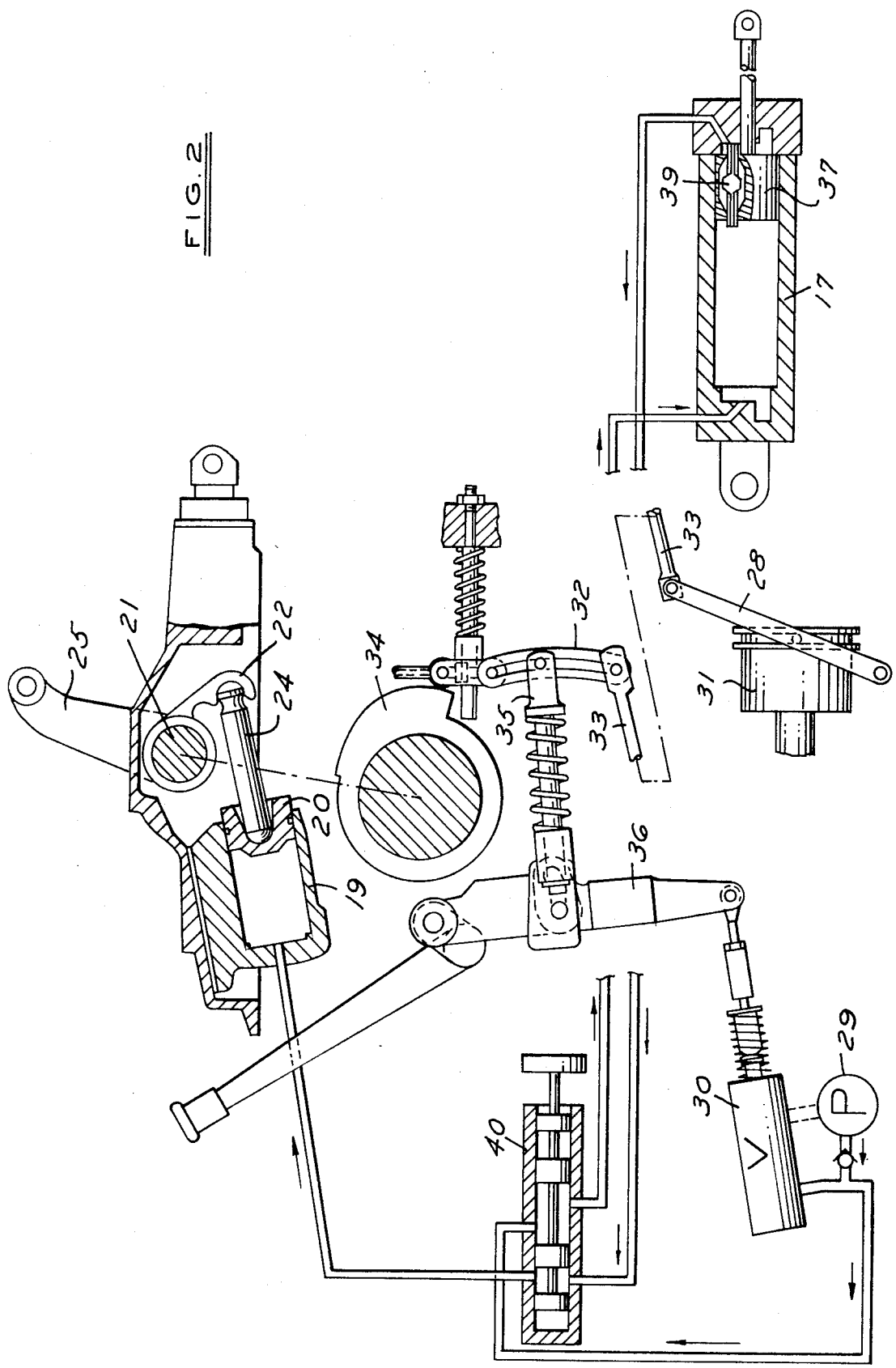
FIG. 2 is a schematic view of the hydraulic system, showing fluid flow during lift condition.

Referring to FIGS. 2 and 3, the implement hydraulic cylinder 17 and tractor lift cylinder 19 are interconnected for simultaneous operation. This is accomplished by connecting the cylinders 17 and 19 in series in a matter that upon the torque sensing device 31 signaling that a lift of the implement is required to prevent driveline torque from increasing above the set limit, fluid under pressure from the pump 29 will pass to one end of the double acting cylinder 17, displacing the piston 37 of that cylinder in a direction to raise the implement and forcing fluid from the opposite end of the cylinder into the lift cylinder 19 to also raise the hitch (FIG. 2). This movement continues until driveline torque has dropped to set value.

Upon the torque sensing device 31 signaling that a drop is required, the control valve 30 will open to permit fluid from the first end of the cylinder 17 to flow to sump, thus permitting the piston 37 to move to the left as viewed in FIG. 3 to lower the implement and permitting fluid from the tractor lift cylinder 19 to flow to the implement cylinder 17, thus permitting the tractor hitch 11 to lower (FIG. 3). This movement continues until the driveline torque has increased to the set value.

Preferably, the total swept volume of the tractor lift cylinder 19 slightly exceeds the total swept volume of the implement cylinder 17. A valve 39 located within the piston 37 is opened by contact with the end of the cylinder upon completion of a stroke in either direction by the piston 37, thus permitting fluid to pass from side to side through the piston 37 and serving to automatically synchronize the movement of the pistons 20 and 37 whenever the cylinders 19 and 17 are moved to completely raised or completely lowered position. Thus, the pistons 20 and 37 are automatically placed in or restored to synchronized movement despite non-synchronized positions of the pistons when coupling the cylinders 19 and 37 together and despite leakage past either of the pistons.

Preferably, a selector valve 40 is provided to control the hydraulic connection between the pump 29, control valve 30, lift cylinder 19 and implement hydraulic cylinder 17. The arrangement is such that the pump and control valve are connected directly to the tractor lift cylinder 19 when operation of only cylinder 19 is desired, as in using a fully mounted implement carried by the tractor hitch 11. In its other position, the selector valve 40 connects the pump 29 and control valve 30 with the first end of the implement cylinder 17 and the opposite end of the cylinder 17 with the tractor lift cylinder 19. For convenience, quick detachable couplers may be provided for connecting hoses from the implement cylinder 17 into the tractor hydraulic system.

In order to assure lowering operation of the cylinder 37 upon the torque sensing device 31 signaling the lowering of the hitch, a spring 41 extending between one of the lift arms 25 and a portion of the tractor may be provided to continually bias the hitch downwardly, thus biasing piston 20 to the left so as to create a pressure within the cylinder 19 and assure flow of hydraulic fluid to the cylinder 17.

The tractor and implement lift system above described may also be used with semi-mounted multi-bottom plows in which the front end of the plow is supported by the tractor hitch 11 and the rear end is supported by a gauge wheel at the rear of the plow. This system permits both ends of the plow to be raised or lowered simultaneously responsive to torque sensed in the tractor driveline. By simultaneously raising or lowering both ends of the plow, rapid changes in tractor driveline torque are avoided, thus reducing the frequency with which implement height must be adusted in order maintain a uniform driveline torque.

I claim:

1. The combination of a tractor having a liftable implement hitch, a single acting hydraulic lift cylinder connected with the hitch, a source of hydraulic fluid under pressure, a control valve for controlling admission of fluid to and escape of fluid from said cylinder to regulate the height of the hitch and means for actuating said control valve responsive to driveline torque to maintain a more or less uniform predetermined torque; and a soil-working implement pulled behind the tractor, said implement having an adjustable gauge wheel to limit depth of penetration of the implement and having a double acting hydraulic cylinder for raising and lowering the gauge wheel, one end of the implement cylinder being connected to the tractor lift cylinder and the other end of the implement cylinder being connected to the control valve whereby the implement cylinder and tractor lift cylinder are operated in unison.

2. The combination of a tractor and implement as claimed in claim 1, in which a spring connected with the tractor hitch biases the hitch downwardly and the implement is pulled directly from the body of the tractor.

3. The combination of a tractor and implement as claimed in claim 2, in which a coil type tension spring is connected between a lift arm of the hitch and the tractor body.

4. The combination of a tractor and implement as claimed in claim 1, in which the displacement of the tractor lift cylinder is slightly in excess of the displacement of the implement lift cylinder.

* * * * *